(12) United States Patent
Martin

(10) Patent No.: US 7,104,378 B2
(45) Date of Patent: Sep. 12, 2006

(54) WET CLUTCH

(75) Inventor: Jay J. Martin, Joliet, IL (US)

(73) Assignee: CNH America LLC, New Holland, PA (US)

( * ) Notice: Subject to any disclaimer, the term of this patent is extended or adjusted under 35 U.S.C. 154(b) by 134 days.

(21) Appl. No.: 10/955,140

(22) Filed: Sep. 30, 2004

(65) Prior Publication Data

US 2006/0065507 A1    Mar. 30, 2006

(51) Int. Cl.
  F16D 25/0638   (2006.01)
  F16D 13/68    (2006.01)

(52) U.S. Cl. .................. 192/70.19; 192/85 AA

(58) Field of Classification Search .......... 192/70.2, 192/70.19
  See application file for complete search history.

(56) References Cited

U.S. PATENT DOCUMENTS

| 1,851,700 | A |   | 3/1932  | Gibbs |
|---|---|---|---|---|
| 2,025,098 | A |   | 12/1935 | Dudick |
| 2,524,311 | A |   | 10/1950 | Fieux |
| 2,766,864 | A | * | 10/1956 | Schilling et al. .......... 192/85 R |
| 2,935,169 | A |   | 5/1960  | Mills |
| 4,003,452 | A | * | 1/1977  | Kupfert et al. ............ 188/71.6 |
| 4,010,831 | A |   | 3/1977  | Reuter |
| 4,173,269 | A | * | 11/1979 | Craig ....................... 188/71.5 |
| 4,425,994 | A |   | 1/1984  | Schele |
| 4,440,282 | A |   | 4/1984  | Ishimaru et al. |
| 5,127,504 | A |   | 7/1992  | Beccaris |
| 5,755,314 | A | * | 5/1998  | Kanda et al. ............ 192/70.12 |
| 6,026,944 | A |   | 2/2000  | Satou et al. |
| 6,189,669 | B1 | * | 2/2001  | Kremer et al. ........... 192/70.12 |
| 6,702,081 | B1 |   | 3/2004  | Gorman et al. |
| 6,920,970 | B1 | * | 7/2005  | Dumas ................... 192/85 AA |
| 7,007,783 | B1 | * | 3/2006  | Gerathewohl et al. ..... 192/70.2 |
| 2004/0060795 | A1 | * | 4/2004  | Schmidt et al. ............ 192/70.2 |
| 2004/0168878 | A1 | * | 9/2004  | Yabe et al. ............. 192/85 AA |

* cited by examiner

*Primary Examiner*—Rodney H. Bonck
(74) *Attorney, Agent, or Firm*—Stephen A. Bucchianeri; John William Stader; Michael C. Harms

(57) ABSTRACT

A wet clutch includes a clutch carrier that encloses a stack of clutch plates and a clutch backing plate. Two sets of alternating slots are provided in the clutch carrier. One set of slots is shallower than the other set and is configured to support the clutch backing plate. The other set of slots is deeper and is configure to support many of the clutch plates. The first set of slots is shallower in order to keep the clutch backing plate from pressing against and partially binding the stack of clutch plates together.

14 Claims, 2 Drawing Sheets

WET CLUTCH

FIELD OF THE INVENTION

The present invention relates generally to transmissions for work vehicles. More particularly, it relates to wet clutches for work vehicle transmissions.

BACKGROUND OF THE INVENTION

Work vehicles employ transmissions that are quite different from those in standard passenger cars. In work vehicles, the power to weight ratio is typically much more limited than it is in automobiles. This means that the engines powering work vehicles are usually running at or near capacity much of the time.

As a result, and particularly for ground engaging vehicles such as tractors towing plows, for example, shifting is critical. In work vehicles, shifting must occur rapidly and with very little delay from the time power is disengaged from the drive wheels to the time power is reengaged to the drive wheels. This rapid disengagement and re-engagement permits work vehicles to change gears much more rapidly than is possible in standard automobiles.

Work vehicles are also provided with gearboxes having much closer gear ratios. Unlike a typical automobile which may have four or even five forward speeds, work vehicles typically have 8, 10 or even 20 forward gears. With this many forward gears, work vehicles spend a great deal of time a shifting from one gear ratio to another to optimize vehicle speed and engine load.

Because of these unusual demands on work vehicle transmissions, they are uniquely designed to permit rapid gear shifting over a wide range of gears. First, they have numerous internal transmission shafts, each carrying several gears. In a common automobile transmission, for example, there may be three shafts with two gears on each shaft. In a work vehicle transmissions, in contrast, there may be five shafts with as many as 12 or 14 gears. This many shafts and this many gears are necessary to provide the number of gear ratios that work vehicle transmissions typically have.

With this many gears, it is practically impossible to shift gears by sliding gears into and out of engagement. This is the traditional manner in automotive gearboxes for changing gears. Yet this system require as a complex array of shift yokes that are disposed inside the transmission case and slide gears back and forth from engagement with one gear to engagement with another gear and even to engagement with no gear at all.

Providing space for sliding the gears and for the shift yokes necessary to slide the gears is prohibitive. Furthermore, even if a transmission could be arrayed with all of the mechanical shifting mechanisms necessary to slide these gears the speed of shifting would be extremely slow.

For this reason, work vehicle transmissions have developed along an entirely different line than those of automotive transmissions. Unlike automotive transmissions, which have a single large master clutch to disengage the drive train, and three or four shifting forks to shift the gears on their shafts, work vehicle transmissions put several small clutches inside the transmission disposed between shafts and gears and between gears themselves.

These transmissions are called "power shift" transmissions. A typical power shift transmission with 15 forward speeds and 6 reverse speeds may have five internal clutches inside the transmission. Again, these clutches are disposed between internal transmission shafts and the gears that turn on the shafts and between adjacent gears themselves.

Clutches in power shift transmissions are "wet" clutches. In other words, they are designed intentionally to run soaked with oil. Indeed, unlike automotive dry plate master clutches, the only way to make wet clutches work in power shift transmissions is to ensure that they have a continuing supply of oil flooding them as they operate.

Oil is critical for the proper operation of wet clutches due to the extreme loads on the clutches in their compact size. Since they are so small, and since they engage and disengage with such great frequency, they are particularly prone to overheating, and are specifically designed with internal oil passages that conduct cooling transmission fluid between them through the plates themselves to conduct the heat they generate away from the clutches and (typically) into a transmission oil cooler.

Wet clutches are designed not with a single plate, but with multiple interdigitated or interleaved plates. These plates are typically much smaller and outside diameter than the single dry plate of an automotive clutch. They must be smaller in outside diameter to fit inside a transmission case without abutting adjacent transmission shafts.

Wet clutches typically have some 15 interdigitated plates. Half of these plates are typically engaged to rotate with the shaft on which the clutch is mounted, and the other half of the plates are typically engaged to rotate with a gear supported on that shaft and that spins freely with respect to that shaft until the clutch is engaged.

Heat is produced at every plate-to-plate junction. A typical stack of plates might be three or 4 inches tall and 5 inches in diameter with a plate width of 1 to 2 inches. To cool all of these junctions, special oil passages are typically drilled into the shaft on which they spin. Oil is forced through the shaft and out through radial holes that abut the inner surface of the stack of clutch plates. When oil is forced into the shaft of the transmission, it passes through this internal passageway down the length of the shaft, out the radial passageways, and into, through, and between the individual clutch plates. As the oil passes between each clutch plate, each clutch plate transfers its heat to the flowing oil. Once the oil passes through the clutch plates in the stack, it leaks out of the clutch entirely and into the open transmission case, where it falls to a common drain the and is pumped away to a transmission fluid cooler. Once it is cooled, it is again pumped back to the transmission, through the transmission shafts, and back through the plates.

As engines with greater and greater horsepower are installed in work vehicles, and as transmissions are made smaller and lighter, and as clutch plates are made more and more compact, more and more heat builds up rapidly in a work vehicle transmission. To remove this heat, engineers have had to redesign and reconfigure transmission clutches to ensure that all of the transmission fluid forced into the clutches in deed passes between the clutch plates and cools the clutch plates. It has recently been discovered that much of the oil passing from the shaft and against the inside surface of the clutch plates did not pass through the clutch plate. Instead of passing through the stack of clutch plates and cooling them, the oil bypasses the clutch plates, passing longitudinally down the clutch hub, between the clutch plates and the shaft, until it reached the end of the stack of clutch plates and ran out without cooling the clutch plates.

The last plate blocking the free flow of oil out of the clutch pack is the clutch backing plate. The clutch backing plate acts as the end cover to the clutch carrier. The clutch backing plate holds the stack of clutch plates inside the carrier. The clutch backing plate is engineered much thicker and stronger than each of the individual clutch plates that comprise the clutch stack.

The clutch backing plate in wet clutches typically has a thickness of between 0.1 and 0.3 inches in the axial direction of the clutch. This thickness gives the clutch backing plate the necessary strength to support one end of the stack of clutch plates when the plates are compressed together by a piston that is positioned in the clutch carrier at the opposite end of the clutch plate stack.

Today, all clutch backing plates are typically restrained in the clutch carrier by the same slots that the other clutch plates are restrained in. These slots extend longitudinally along the outer surface of the clutch carrier and engage small ears or protrusions on each clutch plate in the clutch stack. The engagement of the ears in the slots force the clutch plates to rotate with the clutch carrier when it rotates, yet permit the clutch plates to slide axially.

Since the clutch backing plate is supported in the same slots, it can also slide axially. This is normally not a problem. In the traditional design, the clutch backing plate generally stays at one end of the clutch carrier and does not exert any force on the clutch plate stack when the clutch piston is relaxed and retracted. With new changes to the clutch design, however, the free axial movement of the clutch backing plate in the slots that also support the clutch plate slack poses a problem.

To prevent oil from leaking out between the inner surface of the clutch plates and the clutch hub, engineers devised a system that includes an additional oil seal. This oil seal is disposed between and seals against both the clutch backing plate and the clutch hub. The additional oil seal, sealing against both the clutch hub and the clutch backing plate, prevented oil from flowing through this gap and out of the clutch. Since this exit was sealed off, oil was forced to flow through the clutch stack itself, cooling the plates of the clutch stack, and exiting through the longitudinal slots in the clutch carrier. This additional oil seal prevents the oil from leaking out of the clutch plate cavity and forces the oil to pass through and between the clutch plates. In that sense, it is a success. Unfortunately, it has caused other problems.

The new oil seal is preferably made of polytetrafluoroethylene (also known by its trade name as "Teflon" or PTFE). This PTFE seal swells slightly as the transmission fluid and the clutch components heat up. When it swells, it presses harder against the clutch backing plate. This additional pressure against the clutch backing plate (and the fact that the clutch backing plate typically has a rounded or chamfered edge) forces the clutch backing plate down the clutch carrier slots toward the clutch plate stack. On occasion, the expanded seal will actually push the clutch backing plate against the otherwise slack and disengaged clutch plates of the clutch plate stack.

The pressure of the clutch backing plate acting against the clutch plate stack is not enough to fully engage the clutch plates in the stack, locking them together, and inadvertently engaging the clutch. There is no safety issue. There is a wear issue, however the slight pressure provided by the clutch backing plate against the clutch plate stack is enough to force transmission fluid from between the plates and cause them to spin against each other. This causes the clutch plates to wear much faster than they normally would, and can cause heat damage to the clutch discs.

In addition, rapidly turning clutch plates may "flutter" or oscillate in an axial direction. This flutter affects the clutch backing plate and can cause the backing plate to press the clutch plates together, causing similar clutch plate wear and overheating problems.

What is needed, therefore, is a new clutch that both (1) seals the gap between the clutch backing plate and the shaft, and (2) reduces or eliminates the chance that the clutch backing plate will be pushed against the clutch plate stack.

What is also needed is a new clutch that limits the free movement of the clutch backing plate, thereby preventing it from inadvertently compressing the clutch plate stack.

What is also needed is a clutch with a clutch carrier that restrains the free movement of the clutch backing plate.

These and other advantages are provided by the clutch described below.

SUMMARY OF THE INVENTION

In accordance with a first aspect of the invention, a wet clutch for a transmission is provided, including a clutch carrier having a cylindrical portion with a first plurality of axial slots therein and a second plurality of axial slots therein that are shorter than the first plurality of slots; a gear having a splined hub disposed inside the cylindrical portion; a stack of clutch plates including (i) a first set of clutch plates having protrusions configured to engage the first plurality of slots, and (ii) a second set of clutch plates interleaved with the first set of clutch plates and having splines configured to engage the splined hub; and a clutch backing plate having protrusions configured to engage the second plurality of slots.

The clutch may further comprise a sealing ring disposed on the clutch hub that is configured to seal against the clutch backing plate. The clutch carrier may have a circumference and the first and second pluralities of slots may be disposed in an alternating pattern around the circumference. The first plurality of slots may include 3 to 8 slots and the second plurality of slots may include from 3 to 8 slots. The first and second pluralities of slots may include an equal number of slots. Different depths of the first and second pluralities of slots may insure that at least one clutch plate gap is provided when the clutch is disengaged. The cylindrical portion of the clutch carrier may have a free end in which the first and second pluralities of slots are formed, and the free end may defined a circumferential ring groove on an inner surface thereof. The clutch may further include a snap ring disposed in said groove to enclose the first and second pluralities of slots.

In accordance with a second aspect of the invention, a clutch for a transmission is provided, including a clutch carrier with a first plurality of axial slots and a second plurality of axial slots shorter than the first plurality of slots; a gear having a splined hub disposed inside the clutch carrier; a stack of clutch plates including (i) a first set of clutch plates having ears configured to engage the first plurality of slots, and (ii) a second set of clutch plates interleaved with the first set of clutch plates and having protrusions configured to engage splines of the splined hub; and a clutch backing plate having ears configured to engage the second plurality of slots.

The clutch may further comprise a polymeric sealing ring disposed in a ring groove on the clutch hub and abutting the clutch backing plate. The clutch carrier may have a cylindrical portion circumference and the first and second pluralities of slots may be disposed in the cylindrical portion in an alternating pattern around the circumference. There may be from 3 to 8 slots in the first plurality of slots and there may be from 3 to 8 slots in the second plurality of slots. The first plurality of slots may contain the same number of slots as the second plurality of slots. The first and second pluralities of slots may be configured to insure that the clutch backing plate never presses against the clutch plate stack when the clutch is disengaged. The cylindrical portion of the clutch carrier may have a free end in which the first and second pluralities of slots are formed, and the free end may defined a circumferential ring groove on an inner surface thereof. The clutch may further include a snap ring disposed in said circumferential ring groove to hold the first set of plates in the first plurality of slots and to hold the clutch backing plate in the second plurality of slots.

Numerous other features and advantages of the present invention will become readily apparent from the following detailed description, the accompanying drawings, and the appended claims.

DETAILED DESCRIPTION OF THE PREFERRED EMBODIMENTS

Figure 1:
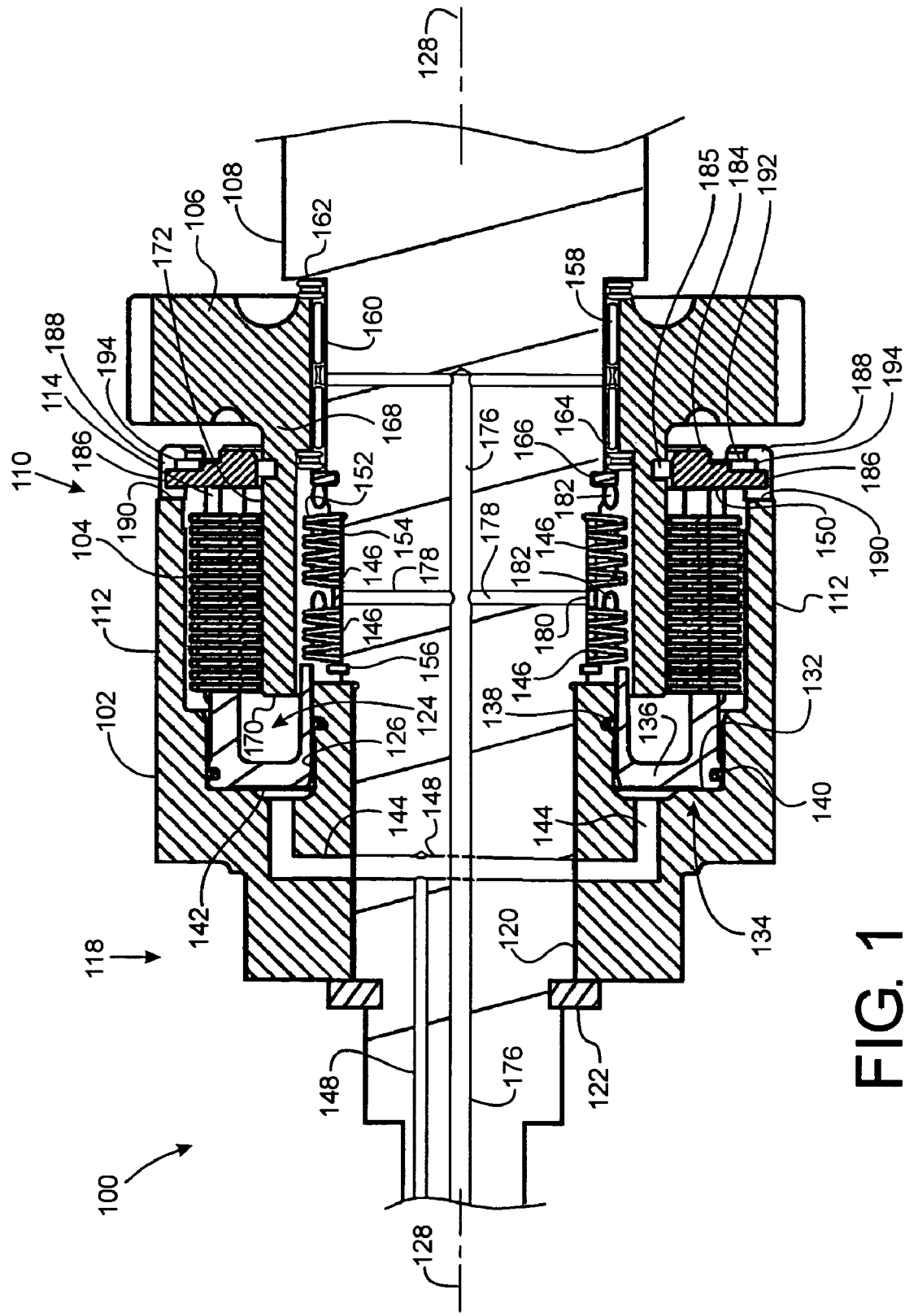
FIG. 1 is a cross-sectional side view of a typical wet clutch made by a cutting plane passing through the longitudinal axis of the transmission shaft on which the clutch is supported.

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Referring now to the FIGURES, there is illustrated a wet clutch 100 having a clutch carrier 102, clutch plate stack 104 made up of a plurality of interdigitated clutch plates, a gear 106 and a shaft 108 on which the clutch 100 is supported.

The clutch carrier 102 is an elongated cylindrical body having a thin cylindrical portion 110 at one end that is separated into a plurality of fingers 112 by a plurality of elongated slots 114. It is this plurality of elongated slots 114 that supports and engages the outwardly-extending ears or protrusions 115 of a first set of clutch plates 116 of the clutch plate stack 104.

The clutch carrier 102 also includes a coupling or shaft mount 118 that is fixed to transmission shaft 108, and is formed integral with and supports thin cylindrical portion 110. Shaft mount 118 includes a central aperture 120 having inwardly facing splines that are dimensioned to receive and engage mating splines on the outer surface of shaft 108. These splines (not shown) ensure that the clutch carrier always rotates with shaft 108. A locking ring 122 is fitted into a groove one shaft 108 and holds clutch carrier 102 in place on the shaft.

Shaft mount 118 of clutch carrier 102 includes a circular slot 124 having an outwardly facing right circular cylindrical wall 126 that is coaxial with the longitudinal axis 128 of the shaft and clutch and an inwardly facing right circular cylindrical wall 130 that is also coaxial with the longitudinal axis 128 of the shaft. Walls 126 and 130 are parallel and spaced and equal distance apart over their entire lengths.

Circular slot 124 also has a generally flat bottom surface 132 that is orthogonal to longitudinal axis 128 of clutch 110 and shaft 108. Walls 126, 130 and bottom surface 132 define a circular hydraulic cylinder 134 that supports a circular piston 136. Piston 136 is supported in cylinder 134 by two sealing rings 138 and 140. Sealing ring 138 is a circular sealing ring that is disposed in a circular groove in the outwardly facing wall 126. Sealing ring 140 is disposed in a circular groove in an outer wall of piston 136. These two sealing rings 138, 140 prevent hydraulic fluid that acts on the back side 142 of piston 136 from leaking out around the sidewalls of the piston.

Clutch carrier 102 has internal hydraulic fluid passages 144 that extend from bottom surface 132 to the inner wall of aperture 120. Passages 144 conduct hydraulic fluid to and from the inner wall of aperture 120 and the bottom side of piston 136. When hydraulic fluid is introduced into passages 144, it forces piston 136 away from the bottom of circular cylinder 134 (to the right as shown in FIG. 1) toward the clutch plate stack 104. When hydraulic fluid is removed from passages 144 and from the bottom of circular cylinder 134, piston 136 is impelled by Belleville washers 146 back into cylinder 134 and away from clutch plate stack 104.

In use, hydraulic valves connected to the transmission apply hydraulic fluid under pressure into passages 148 where it is conducted up shaft 108 and into passages 144 in clutch carrier 102. This fluid then forces piston 136 toward the clutch plate stack compressing the clutch plate stack against clutch backing plate 150. It is this compression that forces the clutch plates together and engages the clutch.

Clutch 100 also includes Belleville washers 146. These washers 146 are arranged in an alternating stack with abutting outside edges 152 alternating with abutting inside edges 154. In this configuration, the stack of washers acts as a spring pushing against circular piston 136 that tends to force piston 136 back into circular cylinder 134. Washers 146 pushes piston 136 away from the clutch plate stack 104 giving the clutch plates room to move with respect to each other without binding.

Thus, whenever hydraulic fluid is released from passages 148, it is washers 146 that force piston 136 away from clutch plate stack 104 and force hydraulic fluid back down passage 148 toward the clutch valve (not shown).

A snap ring 156 is inserted into a circumferential groove in shaft one await that is adjacent to Belleville washers 146. Ring 156 holds Belleville washers 146 in place on shaft 108.

Clutch 100 also includes gear 106. Gear 106 is supported on shaft 108 for free rotation by needle bearings 158. These bearings are disposed on a circular circumferential surface 160 of shaft 108. Gear 106 is held in its longitudinal position on shaft one await by two thrust bearings 162 and 164. Thrust bearing 162 is disposed between gear 106 and shaft 108. Thrust bearing 164 is disposed between gear 106 and a snap ring 166 that is inserted into a circumferential groove in shaft 108. With thrust bearings disposed on either side of gear 106, the gear cannot move in a longitudinal direction along shaft 108. It is permitted to rotate freely on shaft 108 since it is supported by needle bearings 160, however.

Gear 106 has a hub 168 with a thin-walled longitudinal cylindrical portion 170 extending therefrom. Cylindrical portion 170 has a smaller diameter than cylindrical portion 110 of clutch carrier 102. Cylindrical portion 170 is disposed inside cylindrical portion 110 to form (together with portion 110) two thin nested cylinders. The outer surface 172 of cylindrical portion 170 is splined in a conventional manner with a longitudinal splines extending parallel to longitudinal axis 128 of clutch 100 and shaft 108. These splines engage mating splines 173 on a second set 174 of clutch plates that are interdigitated with the first set 116 of the clutch plates. The second set 174 of clutch plates slide freely in a direction parallel to longitudinal axis 128 of shaft 108 and of gear 106 along the outer surface of cylindrical portion 170 without binding. The mating splines, however, constrain the second set 174 of clutch plates to always rotate with cylindrical portion 170 of gear 106.

Both the first and the second sets of plates are interdigitated or interleaved: the plates of first set 116 (which have outwardly extending ears or protrusions 115 that are disposed in slots 114) are alternated in the clutch plate stack 104 with plates of second set 174 (which have inwardly extending splines 173 that are disposed in longitudinal mating splines on the outer surface of cylindrical portion 170). Each plate from the first set is followed by a plate from the second set in clutch plate stack 104, and each plate from the second set is followed by a plate from the first set.

When piston 136 applies pressure to the clutch plate stack, it forces both sets of interleaved plates together causing them to rotate together as one. Since the second set of plates 174 is engaged by splines to gear 106, and the first set of plates 114 is engaged by ears or protrusions to clutch carrier 102, and since clutch carrier 102 is fixed to shaft 108, gear 106 rotates with shaft 108 whenever the clutch is engaged. When piston 136 is forced against the clutch plate stack, it causes the clutch plate stack to lock together and rotate as one single structure, this also causes gear 106 to rotate together with shaft 108 as though gear 106 was fixed rigidly on shaft 108.

Clutch 100 is cooled by a flow of cooling transmission fluid that is applied by a clutch valve (not shown) to the end of shaft 108. Fluid applied to the end of shaft 108 is forced into the opening of cooling fluid passages 176. Passages 176 conduct fluid to the right (in FIG. 1) and outward through radial passages 178 to which passages 176 are interconnected. Radial passages 178 conduct the cooling fluid outward to the surface of shaft 108 and through a perforated spacer 180 that extends around shaft 108 in the middle of the stack of Belleville washers 146. Cooling fluid passes through perforated spacer 180 into the space defined between Belleville washers 146 and the inner surface of cylindrical portion 170. Cylindrical portion 170 has a plurality of holes 182 that extend completely through cylindrical portion 170. These holes 182 permit cooling fluid to pass through cylindrical portion 170 and against the inner edges of the plates in the clutch plate stack 104. The clutch plates have slotted or grooved engaging surfaces. These slots or grooves (not shown) provide passages for the cooling fluid to be conducted through the clutch plate stack. Fluid forced against the inside surface of the clutch plate stack will be conducted through the clutch plate stack itself and out the outer surface of the clutch plate stack 104. Once the cooling fluid is passed through the clutch plate stack, it exits through slots 114 in clutch carrier 102.

In previous designs, the cooling fluid could avoid passing through the small slots or grooves in the clutch plates by traveling laterally along the outer surface of cylindrical portion 170 until it escaped between cylindrical portion 170 and clutch backing plate 184. This is now prevented by the presence of circular seal 185 which is disposed in a circumferential groove in the outer surface of cylindrical portion 170 and abuts the inner surface of clutch backing plate 184. By filling this gap between clutch backing plate 184 and cylindrical portion 170, seal 185 blocks the escape of cooling fluid that is injected into the clutch.

Clutch backing plate 184 is a heavy steel ring approximately 0.1 to 0.3 inches thick. Clutch backing plate 184 has a plurality of outwardly extending ears or protrusions 186 that are disposed in shallow slots 188. Slots 188 extend only 0.2 to 0.5 inches in a longitudinal direction. Slots 188 are much shallower than slots 114 which support the clutch plate stack 104. Slots 188 are cut to a depth such that when clutch backing plate 184 abuts the bottom 190 of the slots 188, there is a gap between clutch backing plate 184 and clutch plate stack 104. Clutch backing plate 184 cannot compress clutch plate stack 104 when piston 136 is relaxed and the clutch is disengaged. The clutch plates making up clutch plate stack 104 always free to rotate with respect to each other without being bound together by pressure from clutch backing plate 184. Thus, even if seal 185 pushes clutch backing plate 184 toward clutch plate stack 104, it can go no further then the bottom 190 of slots 188 and no farther. It cannot compress the plates in the clutch plate stack. Clutch backing plate 184 is held in slots 188 by a snap ring 192 that expands to be fixed in a corresponding ring groove 194. Ring groove 194 is preferably formed as one continuous ring groove in the free end of the cylindrical portion of clutch carrier 102. Once the continuous circular ring groove is formed, the first and second pluralities of slots are cut into the clutch carrier. This slots-forming process cuts the continuous circular ring groove into several short groove sections, one each of said sections being disposed at the top of the cylindrical portion and extending from one slot to its adjacent slot.

Figure 2:
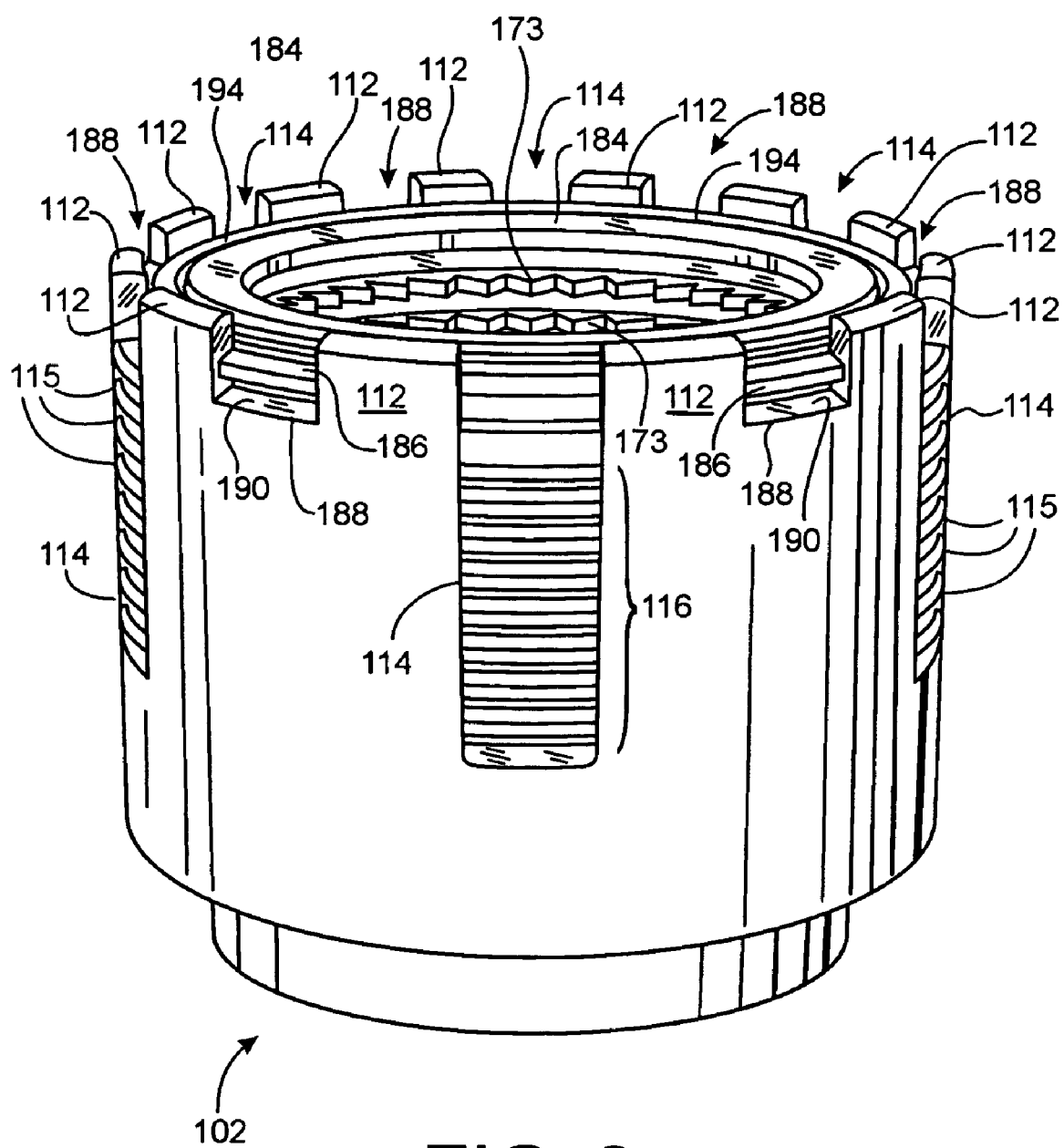
FIG. 2 is a perspective view of the clutch carrier, clutch plates, and clutch backing plate of the clutch of FIG. 1 showing the slots for clutch plate ears or protrusions and the separate slots for the clutch backing plate ears or protrusions.

Referring now to FIG. 2, we can see in perspective view the clutch carrier 102, clutch backing plate 184, clutch plate stack 104, and snap ring 192, with all other components of the clutch removed for clarity of illustration.

In the preferred embodiment illustrated here there are six shallow slots 188 that are configured to support the clutch backing plate 184, and six deeper slots 114 that are configured to support the clutch plate stack 104. In this arrangement, each of the slots is spaced an equal distance from its adjacent slots. Each slot is spaced 30° from its two adjacent slots. The 12 slots define 12 fingers 112 that are also preferably equally spaced about the circumference of the cylindrical portion of the clutch carrier. Every finger 112 preferably has the same width. Every slot 188, 114 preferably has the same width of the as well.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

For example, clutch carrier 102 illustrated FIGS. 1 and 2 may have a gear formed in its outer surface, the gear having a smaller or larger diameter than gear 106. As another example, there may be more or less slots than those illustrated herein. The slots need not be equally spaced. The slots need not be of an equal width. The individual fingers the not be of the same width. The relative depths of slots 114, 188 need not differ as much as shown herein. The hydraulic fluid paths need not extend through the shaft nor need they be dimensioned as shown herein. Fluid for cooling the clutch need not be inserted into the clutch plate stack at the location shown. The different components can be fixed to shaft 108 other than by snap rings, such as by threaded fasteners or weldments, for example. Instead of providing shallow slots that extend all the way through the cylindrical wall of the clutch carrier, other means for restricting the free axial motion of the clutch backing plate can be provided. For example, the slots need not extend all the way through the wall of the clutch carrier. They can extend part way through and the protrusions are ears extending from the clutch backing plate into the slots can be made shorter such that they do not need to extend all the way through the wall of the clutch carrier. In an alternative arrangement, rather than having several distinct ears or protrusions extending outward from its lateral edge, the clutch backing plate can have many outwardly extending protrusions in the form of splines. In another arrangement, the outer edge of the clutch backing plate need not have protrusions or splines, but can merely be circular with a diameter slightly larger than the inside diameter of the clutch carrier designed to accommodate the clutch plates themselves. A circular countersink or counterbore can be provided in the free end of the clutch carrier to receive the circular outer periphery of the clutch backing plate. Other modifications and configurations not explicitly listed here may also be made.

I claim:

1. A wet clutch for a transmission comprising:
   (1) a clutch carrier including a cylindrical portion, the cylindrical portion defining a first plurality of axial slots therein and defining a second plurality of axial slots therein that are shorter than the first plurality of slots;
   (2) a gear including a splined hub disposed inside the cylindrical portion;
   (3) a stack of clutch plates including
      (i) a first set of clutch plates including protrusions configured to engage the first plurality of slots, and
      (ii) a second set of clutch plates interleaved with the first set of clutch plates and including splines configured to engage the splined hub; and
   (4) a clutch backing plate including protrusions configured to engage the second plurality of slots.

2. The clutch of claim 1, further comprising a sealing ring disposed on the gear and configured to seal against the clutch backing plate.

3. The clutch of claim 1, wherein the clutch carrier has a circumference and further wherein the first and second pluralities of slots are disposed in an alternating pattern around the circumference.

4. The clutch of claim 1, wherein the first plurality of slots includes 3 to 8 slots and further wherein the second plurality of slots includes 3 to 8 slots.

5. The clutch of claim 1, wherein the first and second pluralities of slots include an equal number of slots.

6. The clutch of claim 1, wherein different depths of the first and second pluralities of slots insure that at least one clutch plate gap is provided when the clutch is disengaged.

7. The clutch of claim 1, wherein the cylindrical portion of the clutch carrier has a free end in which the first and second pluralities of slots are formed, and further wherein the free end defines a circumferential ring groove on an inner surface thereof, the clutch further comprising a snap ring disposed in said groove to enclose the first and second pluralities of slots.

8. A clutch for a transmission comprising:
   (1) a clutch carrier defining a first plurality of axial slots and a second plurality of axial slots shorter than the first plurality of slots;
   (2) a gear including a splined hub disposed inside the clutch carrier;
   (3) a stack of clutch plates including
      (i) a first set of clutch plates including ears configured to engage the first plurality of slots, and
      (ii) a second set of clutch plates interleaved with the first set of clutch plates and including protrusions configured to engage splines of the splined hub; and
   (4) a clutch backing plate including ears configured to engage the second plurality of slots.

9. The clutch of claim 8, further comprising a polymeric sealing ring disposed in a ring groove on the gear and abutting the clutch backing plate.

10. The clutch of claim 9, wherein the clutch carrier has a cylindrical portion circumference and further wherein the first and second pluralities of slots are disposed in the cylindrical portion in an alternating pattern around the circumference.

11. The clutch of claim 10, wherein there are from 3 to 8 slots in the first plurality of slots and further wherein there are from 3 to 8 slots in the second plurality of slots.

12. The clutch of claim 11, wherein the first plurality of slots contains the same number of slots as the second plurality of slots.

13. The clutch of claim 12, wherein the first and second pluralities of slots are configured to insure that the clutch backing plate never presses against the clutch plate stack when the clutch is disengaged.

14. The clutch of claim 13, wherein the cylindrical portion of the clutch carrier has a free end in which the first and second pluralities of slots are formed, and further wherein the free end defines a circumferential ring groove on an inner surface thereof, the clutch further comprising a snap ring disposed in said circumferential ring groove to (1) hold the first set of plates in the first plurality of slots and (2) hold the clutch backing plate in the second plurality of slots.

* * * * *